US012648051B2

(12) United States Patent
Lin et al.

(10) Patent No.: US 12,648,051 B2
(45) Date of Patent: Jun. 2, 2026

(54) MA PDU DEACTIVATION PROCEDURE FOR MA PDU WITH PDN LEG

(71) Applicant: MEDIATEK INC., Hsin-Chu (TW)

(72) Inventors: Yuan-Chieh Lin, Hsin-Chu (TW);
Chia-Lin Lai, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 627 days.

(21) Appl. No.: 18/071,016

(22) Filed: Nov. 29, 2022

(65) Prior Publication Data

US 2023/0217540 A1     Jul. 6, 2023

Related U.S. Application Data

(60) Provisional application No. 63/294,872, filed on Dec. 30, 2021, provisional application No. 63/294,879, filed on Dec. 30, 2021, provisional application No. 63/294,870, filed on Dec. 30, 2021.

(51) Int. Cl.
H04W 76/30          (2018.01)
(52) U.S. Cl.
CPC .................................. H04W 76/30 (2018.02)
(58) Field of Classification Search
CPC ...... H04W 76/15; H04W 76/30; H04W 76/34
USPC .......................................................... 370/329
See application file for complete search history.

(56) References Cited

U.S. PATENT DOCUMENTS

2019/0313477 A1 * 10/2019 Kim ...................... H04W 76/32
2020/0084744 A1   3/2020 Youn et al. ........... H04W 60/06

2020/0404552 A1   12/2020 Huang-Fu et al. ... H04W 36/00
2020/0413466 A1 * 12/2020 Yu .......................... H04W 76/16
2021/0105858 A1   4/2021 Huang-Fu ............. H04W 76/34
2021/0136854 A1   5/2021 Kuge et al. ........... H04W 76/19
2022/0022089 A1 * 1/2022 Zhu ..................... H04W 56/001
2022/0132454 A1 * 4/2022 Youn ..................... H04W 60/00
2022/0279384 A1 * 9/2022 Sugawara ............. H04W 76/12
2022/0369393 A1 * 11/2022 Huang-Fu ............. H04W 76/11
(Continued)

FOREIGN PATENT DOCUMENTS

CN          110892783 A       3/2020

OTHER PUBLICATIONS

Taiwan IPO, office action for the Taiwanese patent application 111150574 (no English translation is available), dated Jun. 29, 2023 (6 pages).

(Continued)

*Primary Examiner* — Robert J Lopata
(74) *Attorney, Agent, or Firm* — Helen Mao; Zheng Jin; Imperium Patent Works

(57)          ABSTRACT

A method for handling a PDU session release command for releasing an MA PDU session with a PDN connection established as user-plane resource on 3GPP access is proposed. For an MA PDU session with both EPS/4G 3GPP leg and 5GS non-3GPP leg, if UE/NW wants to release the MA PDU session, UE/NW needs to initiate two procedures. First/Second, to release the EPS 3GPP leg, UE/NW should initiate a PDN disconnect procedure/deactivate EPS bearer context procedure or a detach procedure. Second/First, to release the 5GS non-3GPP leg, UE/NW should initiate a PDU session release procedure. The UE/NW can also initiate two procedures simultaneously. It is also possible that the UE initiates one procedure and the NW initiates the other procedure.

16 Claims, 4 Drawing Sheets

(56)  References Cited

U.S. PATENT DOCUMENTS

| | | | |
|---|---|---|---|
| 2022/0408397 A1* | 12/2022 | Zhu ....................... | H04W 60/06 |
| 2023/0018903 A1* | 1/2023 | Mathur ................. | H04W 60/04 |
| 2023/0078760 A1* | 3/2023 | Yi ....................... | H04W 60/005 |
| | | | 370/328 |

OTHER PUBLICATIONS

Europe IPO, search report for the European patent application 22214507.0, dated Jun. 1, 2023 (6 pages).

* cited by examiner

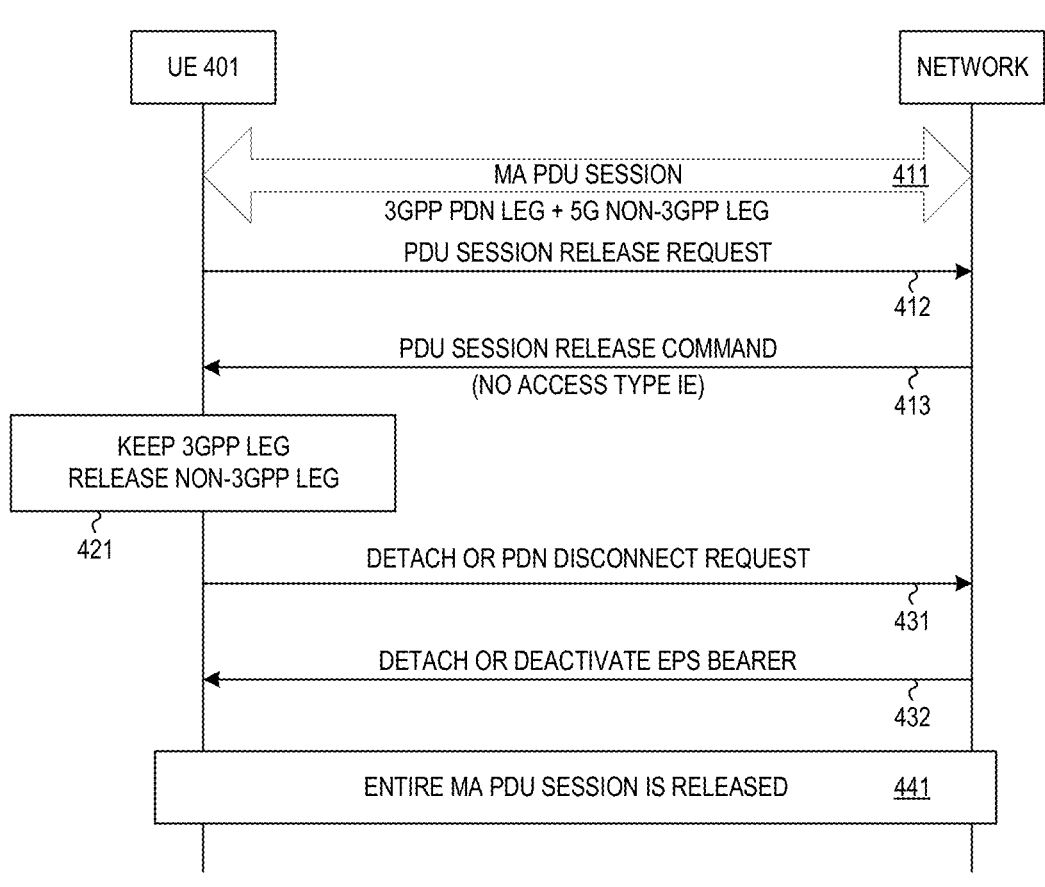

UE 401

NETWORK

MA PDU SESSION                                                411

3GPP PDN LEG + 5G NON-3GPP LEG

PDU SESSION RELEASE REQUEST

412

PDU SESSION RELEASE COMMAND
(NO ACCESS TYPE IE)

413

KEEP 3GPP LEG
RELEASE NON-3GPP LEG

421

DETACH OR PDN DISCONNECT REQUEST

431

DETACH OR DEACTIVATE EPS BEARER

432

ENTIRE MA PDU SESSION IS RELEASED        441

NETWORK

MA PDU SESSION                                                511

3GPP PDN LEG + 5G NON-3GPP LEG

PDU SESSION RELEASE COMMAND
(NO ACCESS TYPE IE)

512

KEEP 3GPP LEG
RELEASE NON-3GPP LEG

521

DETACH OR DEACTIVATE EPS BEARER

532

ENTIRE MA PDU SESSION IS RELEASED        541

FIG. 5

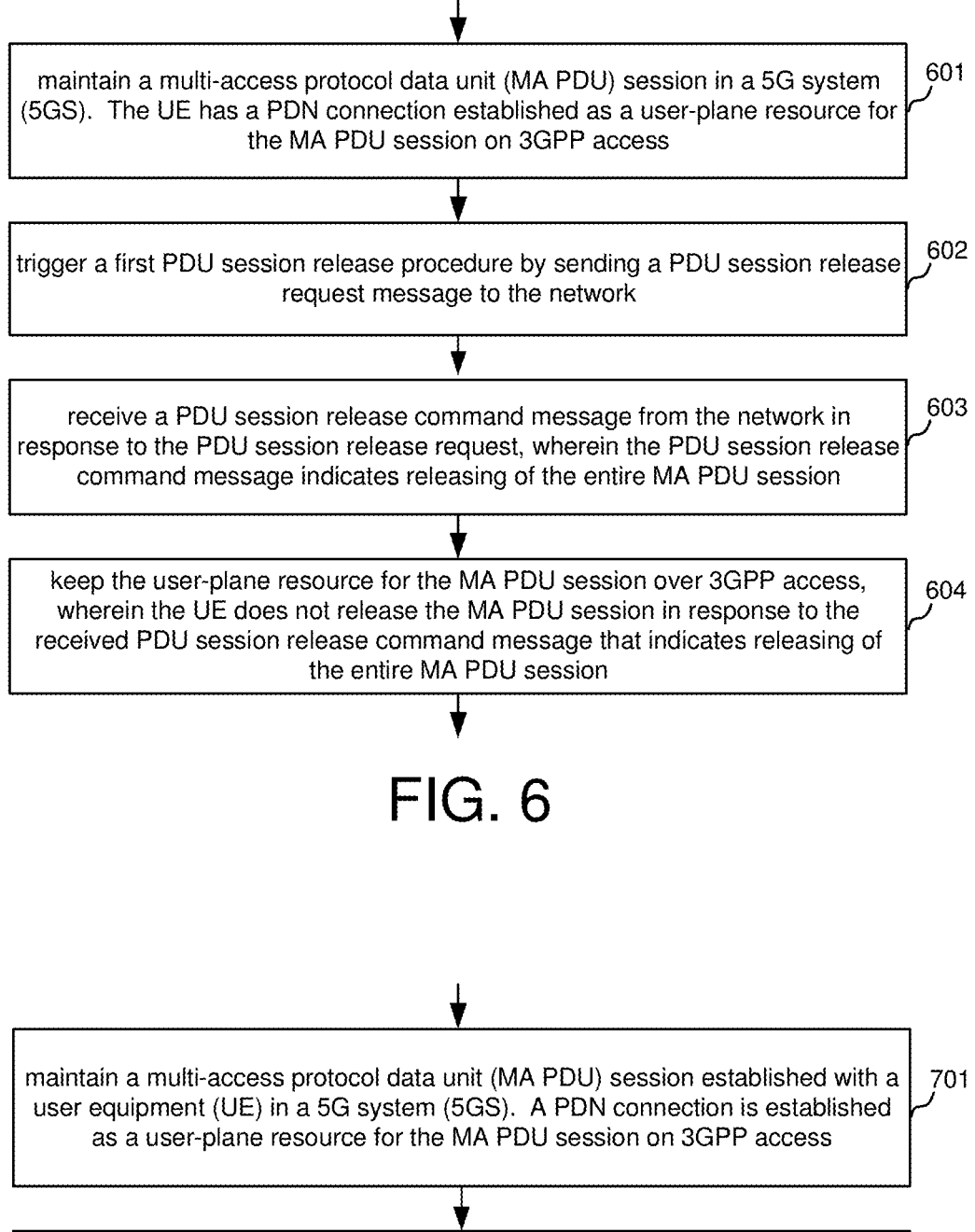

maintain a multi-access protocol data unit (MA PDU) session in a 5G system (5GS). The UE has a PDN connection established as a user-plane resource for the MA PDU session on 3GPP access          601 trigger a first PDU session release procedure by sending a PDU session release request message to the network          602 receive a PDU session release command message from the network in response to the PDU session release request, wherein the PDU session release command message indicates releasing of the entire MA PDU session          603 keep the user-plane resource for the MA PDU session over 3GPP access, wherein the UE does not release the MA PDU session in response to the received PDU session release command message that indicates releasing of the entire MA PDU session          604

FIG. 6 maintain a multi-access protocol data unit (MA PDU) session established with a user equipment (UE) in a 5G system (5GS). A PDN connection is established as a user-plane resource for the MA PDU session on 3GPP access          701 triggering a network-requested procedure to release the PDN connection and the user-plane resource for the MA PDU session on 3GPP access          702

FIG. 7

MA PDU DEACTIVATION PROCEDURE FOR MA PDU WITH PDN LEG

CROSS REFERENCE TO RELATED APPLICATIONS

This application claims priority under 35 U.S.C. § 119 from U.S. Provisional Application No. 63/294,870, entitled "ATSSS MA PDU deactivation due to signaling", filed on Dec. 30, 2021; U.S. Provisional Application No. 63/294,872, entitled "ATSSS PDU deactivation procedure for an MA PDU with PDN leg", filed on Dec. 30, 2021; U.S. Provisional Application No. 63/294,879, entitled "ATSSS DETACH and DEREG handling of an MA PDU session", filed on Dec. 30, 2021, the subject matter of each of the foregoing is incorporated herein by reference.

TECHNICAL FIELD

The disclosed embodiments relate generally to wireless communication, and, more particularly, to method of multi-access (MA) PDU session deactivation handling for MA PDU with PDN leg.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile tele-communication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board has decided to focus the future NGMN activities on defining the end-to-end requirements for 5G new radio (NR) systems (5GS). The 5GS is also integrated with legacy E-UTRAN (4G) system.

In 5GS, a protocol data unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G access network (e.g., 3GPP radio access network (RAN), or via a non-3GPP access). The network and/or the UE can initiate different PDU session procedures, e.g., PDU session establishment, PDU session modification, and PDU session release, for managing the activation, modification, and deactivation of 5GS PDU sessions. 4G EPS (EUTRAN connected to EPC) can also be regarded as "3GPP access" of EPC.

Operators are seeking ways to balance data traffic between mobile networks and non-3GPP access in a way that is transparent to users and reduces mobile network congestion. UEs can be simultaneously connected to both 3GPP access (3GPP access of 5GS, or 3GPP access of EPC) and non-3GPP access (using NAS signalling), thus the 5GS is able to take advantage of these multiple accesses to improve the user experience and optimize the traffic distribution across various accesses. Accordingly, 3GPP introduced Multi-Access (MA) PDU session in 5GS. An MA PDU session can be configured to use one 3GPP access network or one non-3GPP access network at a time, or simultaneously one 3GPP access network (4G or 5G) and one non-3GPP access network (5G).

In addition, ATSSS (Access Traffic Steering, Switching, Splitting) is an optional feature that can be supported by the UE and the 5GC network to route data traffic across 3GPP access and non-3GPP access networks for the established MA PDU session. An ATSSS-capable UE establishes an MA PDU session supporting multi-access connectivity over 3GPP access and non-3GPP access networks. At any given time, the MA PDU session can have user-plane resources established on both 3GPP access (also referred as 3GPP leg, e.g., 3GPP 5GS leg or 3GPP EPS/PDN leg) and non-3GPP access (also referred as non-3GPP leg), or on one access only (either 3GPP access or non-3GPP access).

In certain networks, LTE has more coverage than NR, and sometimes UE are not able to establish 3GPP 5GS leg for an MA PDU session when NR coverage is unavailable. Therefore, it is beneficial that a 4G EPS PDN connection can be established as a user-plane resource for a corresponding MA PDU session over 3GPP access (also referred as 3GPP PDN leg). It is unclear, however, on how to deactivate or release an MA PDU session with a 3GPP PDN leg in 5GS. It is undefined whether a UE or network-requested PDU session release procedure in 5GS can be used to deactivate and release an MA PDU session with a 3GPP PDN leg in 5GS.

SUMMARY

A method for handling a PDU session release command for releasing an MA PDU session with a PDN connection established as a user-plane resource (on 3GPP access) is proposed. For an MA PDU session with EPS/4G 3GPP leg and 5GS non-3GPP leg, if UE wants to release the MA PDU session, UE needs to initiate two procedures. First/Second, to release the EPS/4G 3GPP leg, UE should initiate a UE-requested PDN disconnect procedure by sending a PDN DISCONNECT REQUEST message to the network or initiate a UE-initiated detach procedure by sending a DETACH REQUEST message to the network. Second/First, to release the 5GS non-3GPP leg, UE should initiate a UE-requested PDU session release procedure by sending the PDU SESSION RELEASE REQUEST message to the network.

Similarly, for an MA PDU session with EPS/4G 3GPP leg and 5GS non-3GPP leg, if NW wants to release the MA PDU session, NW needs to initiate two procedures. First/Second, to release the EPS 3GPP leg, NW should initiate the EPS bearer context deactivation procedure by sending the DEACTIVATE EPS BEARER CONTEXT REQUEST message to the UE (to deactivate the default EPS bearer context of the PDN connection) or initiate the network initiated detach procedure by sending the DETACH REQUEST message to the UE. Second/First, to release the 5GS non-3GPP leg, NW should initiate the network-requested PDU session release procedure by sending the PDU SESSION RELEASE COMMAND message with the Access type IE indicating "non-3GPP access" or without including the Access type IE to the UE. It is also possible that the UE initiates a procedure to release the PDN leg (or non-3GPP leg) and the NW initiates a procedure to release the non-3GPP leg (or PDN leg), so at the end the MA PDU is released.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 is a sequence flow between a UE and 5GS for a UE-initiated MA PDU session release procedure in accordance with one novel aspect.

FIG. 5 is a sequence flow between a UE and 5GS for a NW-initiated MA PDU session release procedure in accordance with one novel aspect.

FIG. 6 is a flow chart of a method of handling MA PDU session release procedure from UE perspective in accordance with one novel aspect of the present invention.

FIG. 7 is a flow chart of a method of handling MA PDU session release procedure from NW perspective in accordance with one novel aspect of the present invention.

DETAILED DESCRIPTION

Reference will now be made in detail to some embodiments of the invention, examples of which are illustrated in the accompanying drawings.

Figure 1:
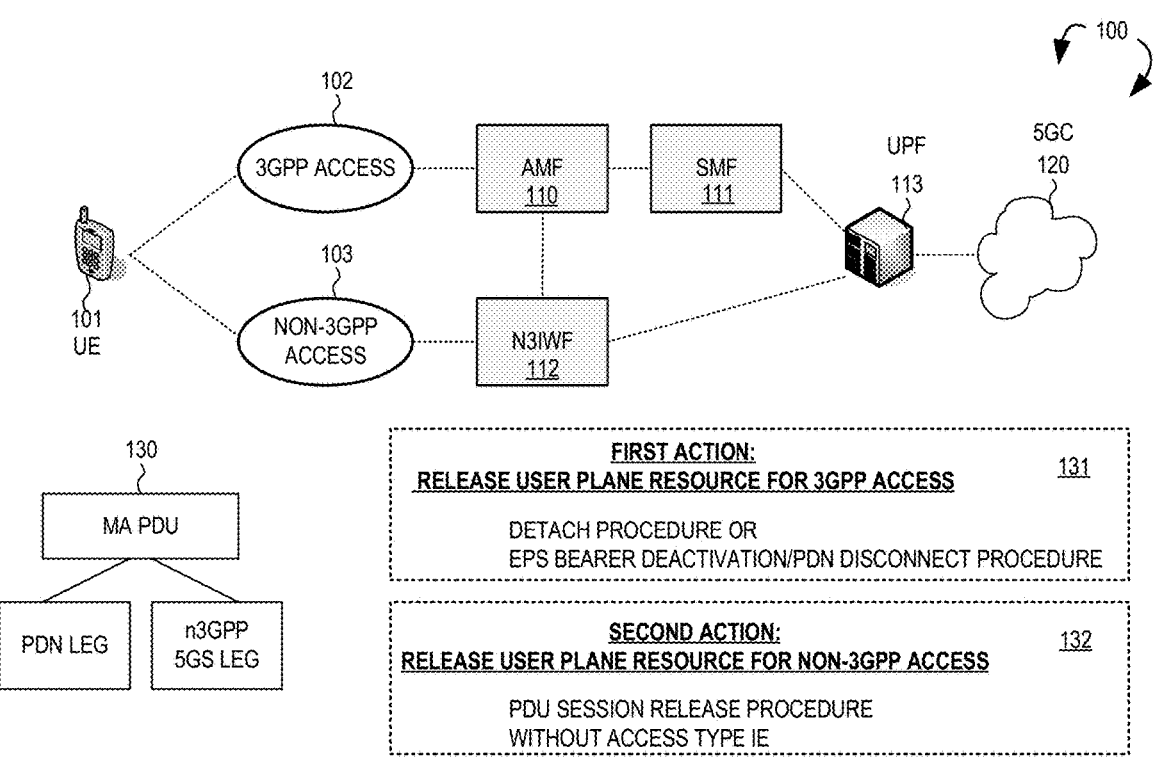
FIG. 1 illustrates an exemplary 5G network supporting multi-access (MA) protocol data unit (PDU) session management and a method for releasing MA PDU session with PDN connection established as user-plane resource in accordance with one novel aspect.

FIG. 1 illustrates an exemplary 5G network 100 supporting multi-access (MA) protocol data unit (PDU) session management and a method for releasing an MA PDU session with a PDN connection established as a user-plane resource of the MA PDU session in accordance with one novel aspect. 5G new radio (NR) network 100 includes a user equipment (UE) 101, a 3GPP access 102 (e.g., a 3GPP NR or EUTRAN radio access network (RAN)), a non-3GPP access 103 (e.g., a non-3GPP RAN), an access and mobility management function (AMF) 110, a session management function (SMF) 111, a non-3GPP interworking function (N3IWF) 112, a user-plane function (UPF) 113, and a 5G core (5GC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating, and removing PDU sessions and managing session context with the UPF 113. The N3IWF 112 interfaces to 5G core network control plane functions, responsible for routing messages outside 5G RAN.

In Access Stratum (AS) layer, RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs)

providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

In 5G, a PDU session defines the association between the UE and the data network that provides PDU connectivity service. Each PDU session is identified by a PDU session ID, and may include multiple QoS flows and QoS rules. Each PDU session can be established over a 3GPP RAN, or over a non-3GPP access. 5G session management (5GSM) for PDU sessions over both 3GPP access and non-3GPP access are managed by AMF and SMF via NAS signaling. In 5GS, UEs can be simultaneously connected to both 3GPP access and non-3GPP access (using NAS signalling), thus the 5GS is able to take advantage of these multiple accesses to improve the user experience and optimize the traffic distribution across various accesses. Accordingly, 3GPP introduced MA PDU sessions in 5GS. An MA PDU session uses one 3GPP access network or one non-3GPP access network at a time, or simultaneously one 3GPP access network and one non-3GPP access network.

For MA PDU session over 3GPP access, a user-plane resource needs to be established on 3GPP access (also referred as 3GPP 5GS leg). For MA PDU session over non-3GPP access, user-plane resources need to be established on non-3GPP access (also referred as non-3GPP 5GS leg). It is observed that a 4G EPS PDN connection can be established as a user-plane resource for a corresponding MA PDU session over 3GPP access (also referred as 3GPP PDN leg). It is unclear, however, on how to deactivate or release an MA PDU session with a 3GPP PDN leg. It is undefined whether a UE/network-requested PDU session release procedure in 5GS can be used to deactivate and release an MA PDU session with a 3GPP PDN leg.

In accordance with one novel aspect, a method of handling the deactivation of MA PDU session with 3GPP PDN leg is proposed. In the example of FIG. 1, UE 101 establishes and maintains an MA PDU (130) over both 3GPP access and non-3GPP access in 5GS, and the MA PDU session has one 3GPP PDN leg and one non-3GPP WiFi leg. When the network or the UE wants to deactivate and release the MA PDU session, a PDU SESSION RELEASE COMMAND needs to be sent to the UE. For MA PDU session, the PDU SESSION RELEASE COMMAND may contain an ACCESS TYPE Information Element (IE) that indicates which leg/access type is to be released for the MA PDU session. If the PDU SESSION RELEASE COMMAND message does not contain the ACCESS TYPE Information Element (IE), in the original MA PDU session signaling design, this means that the network wants to release the whole MA PDU session and all its (one or two) legs with using a single PDU SESSION RELEASE COMMAND message, no matter what. However, the 3GPP PDN leg is not considered as a pure typical/classical 5GS PDU session. Therefore, if ACCESS TYPE IE is NOT included, (which implies to release both accesses, however) if the 3GPP leg is a 4G/EPS PDN leg, then UE 101 does not release the 3GPP PDN leg, does not release the MA PDU session, but releases only the non-3GPP leg.

In order to release a 5GS MA PDU session which has an EPS PDN connection established as a user-plane resource over 3GPP access, two actions are needed. First/Second action is to release the PDN connection established as a user-plane resource of the MA PDU session (131). Second/First action is to release the user-plane resources, if any, established on non-3GPP access of the MA PDU session (132). For network triggered MA PDU release, the network initiates an EPS bearer context deactivation procedure or a detach procedure under the first/second action, and initiates a PDU session release procedure without including the ACCESS TYPE IE under the second/first action. For UE triggered MA PDU release, the UE initiates a PDN discon-nect procedure or a detach procedure under the first/second action, and initiates a PDU session release procedure under the second/first action. Note that the UE (or the network) can also initiates the PDN disconnect procedure/detach proce-dure and the PDU session release procedure at the same time.

Figure 2:
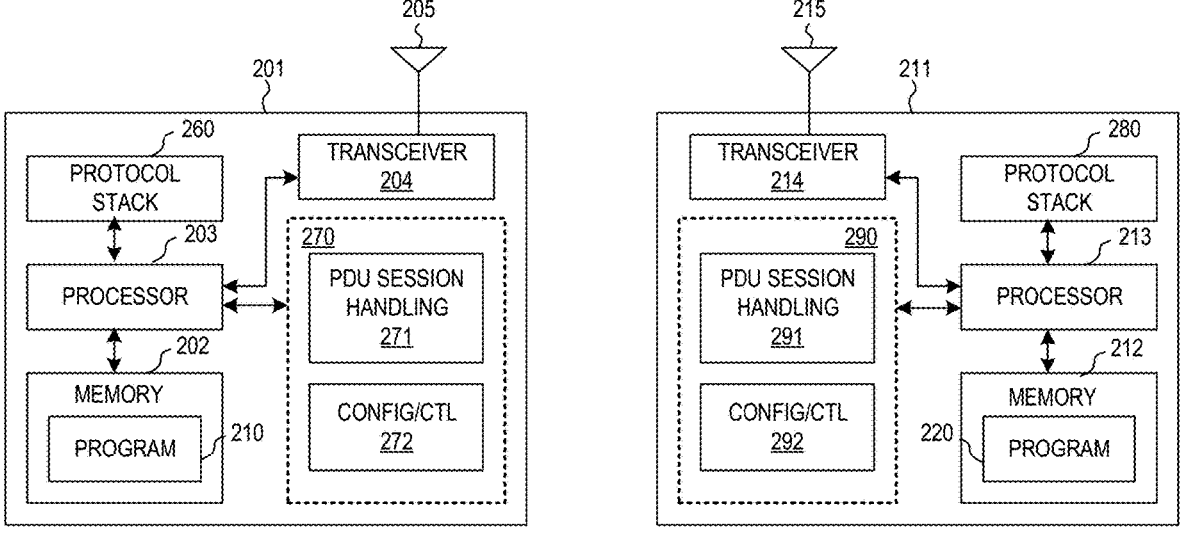
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accor-dance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes PDU session handling circuit 291 that handles PDU establishment, modi-fication, and release procedures, and configuration and con-trol circuit 292 that provides different parameters to config-ure and control UE of related functionalities including mobility management and PDU session management.

Similarly, UE 201 has memory 202, a processor 203, and radio frequency (RF) transceiver module 204. RF trans-ceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a con-troller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by soft-ware, firmware, hardware, and/or combination thereof. The control function modules and circuits, when executed by the processors via program instructions contained in the memory, interwork with each other to allow UE 201 to perform embodiments and functional tasks and features in the network.

In one example, control function modules and circuits 270 includes a PDU session handling circuit 271 that performs MA PDU session establishment, modification, and release procedures with the network, and a config and control circuit 272 that handles configuration and control parameters for mobility management and session management. When the UE receives a PDU SESSION RELEASE COMMAND message with an existing MA PDU session with a PDN leg, the UE completes the PDU session release procedure for the non-3GPP leg, and also initiates a PDN disconnect proce-dure or a detach procedure to release the user-plane resource for the 3GPP PDN leg of the MA PDU session.

Figure 3:
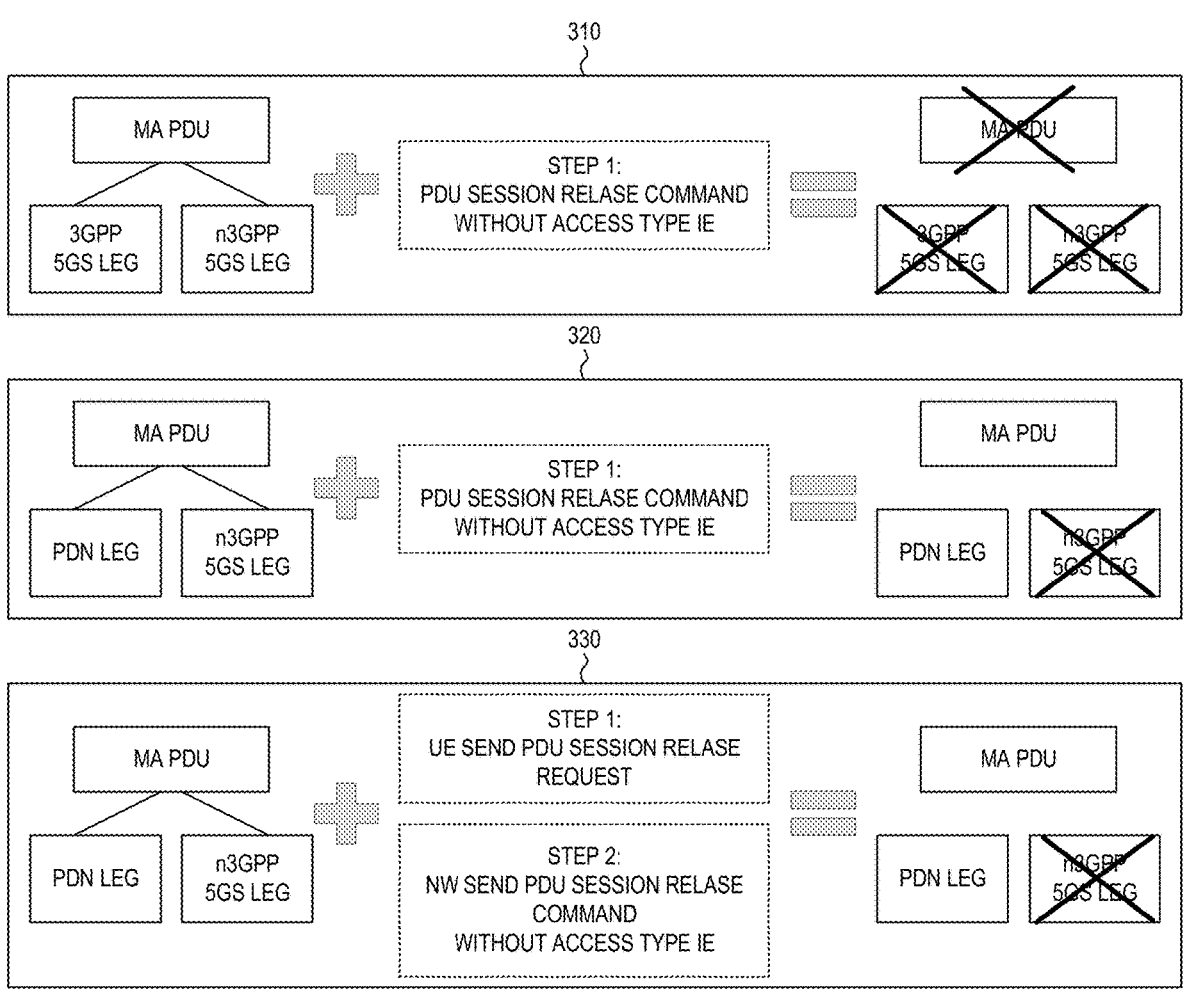
FIG. 3 illustrates different scenarios for handling PDU session release command for MA PDU sessions with 3GPP 5GS leg and 3GPP PDN leg.

FIG. 3 illustrates different scenarios for handling PDU session release command for MA PDU sessions with non-3GPP 5GS leg and 3GPP PDN/5GS leg. In a first example depicted in 310, a UE maintains an MA PDU session, having a 3GPP 5GS leg and a non-3GPP 5GS leg. When the UE receives a PDU SESSION RELEASE COMMAND without ACCESS TYPE IE, it implies that the MA PDU should be release for both access types. As a result, the UE releases the user-plane resources on 3GPP access and the user-plane resources on non-3GPP access. The entire MA PDU session is then released including the 3GPP 5GS leg and the non-3GPP 5GS leg. In a second example depicted in 320, a UE maintains an MA PDU session, having a 3GPP PDN leg and a non-3GPP 5GS leg. When the UE receives a PDU SESSION RELEASE COMMAND without ACCESS TYPE IE, it implies that the MA PDU should be release for both access types. However, the PDN leg is not considered a traditional/typical/classical PDU session in 5GS. As a result, the UE keeps the user-plane resource on 3GPP access and releases the user-plane resource on non-3GPP access. The MA PDU session is not released, it still has the 3GPP PDN leg. In a third example depicted in 330, a UE maintains an MA PDU session, having a 3GPP PDN leg and a non-3GPP 5GS leg. When the UE sends a PDU SESSION RELEASE COMMAND to the network (step 1), and receives a PDU SESSION RELEASE COMMAND without ACCESS TYPE IE from the network (step 2), it implies that the MA PDU should be release for both access types. However, the PDN leg is not considered as a traditional/typical/classical PDU session in 5GS. As a result, the UE keeps the user-plane resource on 3GPP access and releases the user-plane resource on non-3GPP access. The MA PDU session is not released, it still has the 3GPP PDN leg.

FIG. 4 is a sequence flow between a UE and 5GS for a UE-initiated MA PDU session release procedure in accor-dance with one novel aspect. In step 411, UE 401 maintains an MA PDU session in 5GS, with both 3GPP PDN leg and non-3GPP 5GS leg. For UE-initiated MA PDU session release procedure with PDN leg, UE needs to initiate two independent procedures. In step 412, UE 401 initiates a first UE-requested PDU session release procedure in 5GS to deactivate the MA PDU session by sending a PDU SESSION RELEASE REQUEST to the network. In step 413, UE 401 receives a PDU SESSION RELEASE COMMAND from the network, which includes no ACCESS TYPE IE. In response to the PDU SESSION RELEASE COMMAND, in step 421, UE 401 releases the non-3GPP leg, but keeps the 3GPP PDN leg (since it is not considered as a traditional/ typical/classical 5GS PDU session). In order to release the entire MA PDU session, in step 431, UE 401 initiates a second procedure. If ((EMM-REGISTERED without PDN connection is supported by the UE and the MME) or (the PDN connection is not the last PDN connection)), UE 401 initiates a second UE-requested PDN disconnect procedure by sending a PDN DISCONNECT REQUEST message to the network. In step 432, UE 401 receives a DEACTIVATE EPS BEARER CONTEXT REQUEST message for the default EPS bearer context of the PDN connection, then the PDN leg is released. Otherwise, UE 401 initiates a second UE-initiated detach procedure by sending a DETACH REQUEST message to the network. In step 432, UE 401 receives a DETACH (ACCEPT) message from the network and the PDN leg is released. In step 441, the entire MA PDU session is released.

FIG. 5 is a sequence flow between a UE and 5GS for a NW-initiated MA PDU session release procedure in accordance with one novel aspect. In step 511, UE 501 maintains an MA PDU session in 5GS, with both 3GPP PDN leg and non-3GPP 5GS leg. For NW-initiated MA PDU session procedure with PDN leg, the network needs to initiate two independent procedures. In step 512, the network initiates a first NW-requested PDU session release procedure in 5GS to deactivate the MA PDU session by sending a PDU SESSION RELEASE COMMAND to UE 501, which includes no ACCESS TYPE IE. In response to the PDU SESSION RELEASE COMMAND, in step 521, UE 501 releases the non-3GPP leg, but keeps the 3GPP PDN leg (since it is not considered as a traditional/typical/classical 5GS PDU session). In order to release the entire MA PDU session, in step 531, the network initiates a second procedure. If ((EMM-REGISTERED without PDN connection is supported by the UE and the MME) or (the PDN connection is not the last PDN connection)), the network initiates a second NW-requested PDN disconnect procedure (EPS deactivation procedure) by sending a DEACTIVATE EPS BEARER CONTEXT REQUEST message for the default EPS bearer context of the PDN connection to UE 501 and the PDN leg is released. Otherwise, the network initiates a second NW-initiated detach procedure by sending a DETACH REQUEST to UE 501 and the PDN leg is released. In step 541, the entire MA PDU session is released.

FIG. 6 is a flow chart of a method of handling MA PDU session release procedure from UE perspective in accordance with one novel aspect of the present invention. In step 601, a UE maintains a multi-access protocol data unit (MA PDU) session in a 5G system (5GS). The UE has a PDN connection established as a user-plane resource for the MA PDU session on 3GPP access. In step 602, the UE triggers a first PDU session release procedure by sending a PDU session release request message to the network. In step 603, the UE receives a PDU session release command message from the network in response to the PDU session release request, wherein the PDU session release command indicates releasing of the entire MA PDU session, e.g., by not containing an access type information element (IE). In step

604, the UE keeps the user-plane resource for the MA PDU session over 3GPP access, wherein the UE does not release the MA PDU session in response to the received PDU session release command message that indicates the releasing of the MA PDU session.

FIG. 7 is a flow chart of a method of handling MA PDU session release procedure from NW perspective in accordance with one novel aspect of the present invention. In step 701, a network entity maintains a multi-access protocol data unit (MA PDU) session established with a user equipment (UE) in a 5G system (5GS). A PDN connection is established as a user-plane resource for the MA PDU session on 3GPP access. In step 702, the network entity triggers a network-requested procedure to release the PDN connection and the user-plane resource for the MA PDU session on 3GPP access.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   maintaining a multi-access protocol data unit (MA PDU) session by a user equipment (UE) in a 5G system (5GS), wherein the UE has a PDN connection established as a user-plane resource for the MA PDU session on 3GPP access;
   triggering a first PDU session release procedure by sending a PDU session release request message to the network;
   receiving a PDU session release command message from the network in response to the PDU session release request, wherein the PDU session release command message indicates releasing of the entire MA PDU session; and
   keeping the user-plane resource for the MA PDU session over 3GPP access, wherein the UE does not release the MA PDU session in response to the received PDU session release command message that indicates the releasing of the entire MA PDU session.

2. The method of claim 1, wherein the releasing of the entire MA PDU session is indicated by not containing an access type information element (IE) in the PDU session release command message.

3. The method of claim 1, wherein the UE triggers a second procedure to release the user-plane resource for the MA PDU session on 3GPP access.

4. The method of claim 3, wherein the UE initiate a UE-requested PDN disconnect procedure by sending a PDN DISCONNECT REQUEST message to the network.

5. The method of claim 3, wherein the UE initiates a detach procedure by sending a DETACH REQUEST message to the network.

6. The method of claim 3, wherein the UE releases the entire MA PDU session after the PDN connection is released.

7. The method of claim 1, wherein the UE also has user-plane resources established for the MA PDU session on non-3GPP access.

8. The method of claim 7, wherein the UE releases the user-plane resources for the MA PDU session on non-3GPP access in response to the received PDU session release command message.

US 12,648,051 B2

9

9. A User Equipment (UE), comprising:

a protocol data unit (PDU) session handling circuit that maintains a multi-access protocol data unit (MA PDU) session in a 5G system (5GS), wherein the UE also maintains a PDN connection that is established as a user-plane resource for the MA PDU session on 3GPP access;

a transmitter that sends a PDU session release request message to the network and triggers a first PDU session release procedure;

a receiver that receives a PDU session release command message from the network in response to the PDU session release request, wherein the PDU session release command message indicates releasing of the entire MA PDU session; and a control circuit that keeps the user-plane resource for the MA PDU session on 3GPP access, wherein the UE does not release the MA PDU session in response to the received PDU session release command message that indicates the releasing of the entire MA PDU session.

10

10. The method of claim 9, wherein the releasing of the entire MA PDU session is indicated by not containing an access type information element (IE) in the PDU session release command message.

11. The UE of claim 9, wherein the UE triggers a second procedure to release the user-plane resource for the MA PDU session over 3GPP access.

12. The UE of claim 11, wherein the UE initiate a UE-requested PDN disconnect procedure by sending a PDN DISCONNECT REQUEST message to the network.

13. The UE of claim 11, wherein the UE initiates a detach procedure by sending a DETACH REQUEST message to the network.

14. The UE of claim 11, wherein the UE releases the entire MA PDU session after the PDN connection is released.

15. The UE of claim 9, wherein the MA PDU session has user-plane resources established over non-3GPP access.

16. The UE of claim 15, and wherein the UE releases the user-plane resources for the MA PDU session on non-3GPP access in response to the received PDU session release command.

* * * * *